United States Patent [19]

Tanaka

[11] Patent Number: 5,301,070

[45] Date of Patent: Apr. 5, 1994

[54] INFORMATION SIGNAL REPRODUCING APPARATUS HAVING THREE REPRODUCING MODES

[75] Inventor: Yasuyuki Tanaka, Tokyo, Japan

[73] Assignee: Canon Kabushiki Kaisha, Tokyo, Japan

[21] Appl. No.: 34,590

[22] Filed: Mar. 22, 1993

Related U.S. Application Data

[63] Continuation of Ser. No. 625,500, Dec. 11, 1990, abandoned.

[30] Foreign Application Priority Data

Dec. 14, 1989 [JP] Japan .................................. 1-324590

[51] Int. Cl.$^5$ ...................... H04N 5/78; G11B 15/46; G11B 15/14
[52] U.S. Cl. .................................. 360/10.1; 360/10.3; 360/73.05; 360/64
[58] Field of Search .............................. 360/10.1–10.3, 360/70, 73.05, 73.06, 73.07, 64, 62

[56] References Cited

U.S. PATENT DOCUMENTS 4,293,880 10/1981 Tsukada et al. ...................... 360/70
4,530,038 7/1985 Nareta .................................. 360/10.3

FOREIGN PATENT DOCUMENTS 55-30278 3/1980 Japan .................................. 360/10.2
2086171 5/1982 United Kingdom ............... 360/10.1

Primary Examiner—Aristotelis Psitos
Assistant Examiner—Varsha V. Sheladia
Attorney, Agent, or Firm—Robin, Blecker, Daley & Driscoll

[57] ABSTRACT

An apparatus in which an information signal recorded on a tape-like recording medium formed with a number of tracks in accordance with a first or second recording mode in which the number of recording tracks per unit time differ, is reproduced from the tape-like recording medium by reproducing assembly including first and second reproducing heads. The reproducing apparatus has first to third reproducing modes: the first reproducing mode, in which the tape-like recording medium recorded in the first recording mode is conveyed at substantially the same speed as that in the first recording mode and the recording signal, is reproduced by using both of the first and second heads; the second reproducing mode, in which the tape-like recording medium recorded in the second recording mode wherein the number of recording tracks per unit time is smaller than the first recording mode, is conveyed at substantially the same speed as that in the second recording mode and the recording signal is reproduced by using only the first heads; and the third reproducing mode, in which the tape-like recording medium recorded in the second recording mode, is conveyed at a speed different from that in the second recording mode and the recording signal is reproduced by using both the first and second heads.

15 Claims, 9 Drawing Sheets

INFORMATION SIGNAL REPRODUCING APPARATUS HAVING THREE REPRODUCING MODES

This is a continuation divisional application under 37 CFR 1.62 or prior application Ser. No. 625,500, filed Dec. 11, 1990, now abandoned.

BACKGROUND OF THE INVENTION

1. Field of the Invention

The present invention relates to a reproducing apparatus of a signal recorded on a tape-like recording medium.

2. Related Background Art

Hitherto, a recording and reproducing apparatus for recording and reproducing a digital signal onto a magnetic tape by the helical scanning method has been well known. Further, there has also been known an apparatus with a construction which realizes both a normal recording mode of a normal recording time and a long time recording mode, which can execute the recording for a longer time by reducing the number of data tracks recorded in a unit time, although picture quality slightly deteriorates (for instance, JP-A-63-306504).

FIG. 1 shows a constructional block diagram of a conventional example of a digital signal recording and reproducing apparatus having both the normal mode and the double mode which can record for a long time, i.e. twice as long as the normal recording time. An analog video signal of the interlace scan in which one frame is constructed by two fields is input to an input terminal 10. An A/D converter 12 samples the input video signal by a sampling frequency, which is two or more times as high as the highest frequency of the video signal, and converts it into a digital signal of, for instance, eight bits. An output of the A/D converter 12 is once stored into a frame memory 14, which eliminates a blanking period is eliminated. On the other hand, in the double mode, a time base conversion is executed so as to match with a recording timing, which will be explained later herein. The signal from which the blanking period was eliminated by the frame memory 14 is supplied to a multiplexer 20 through a switch 18 in the normal mode. In the double mode, the signal from the frame memory 14 is compressed by a DPCM encoding circuit 16 and, thereafter, it is applied to the multiplexer 20 via the switch 18. The DPCM encoding circuit 16 non-linearly digitizes the difference between the present pixel and the preceding pixel by use of, for example, a correlation of images, thereby compressing the 8-bit digital signal into a the 4-bit signal in the amplitude direction and reducing an information amount into ½.

The multiplexer 20 divides the input signal into the signals of two systems. Error correction code (ECC) addition circuits 22A and 22B add error correction codes to outputs of the two systems of the multiplexer 20. An ID generation circuit 24 generates a signal in which a strong error correction code was added to identification (ID) data such as present recording mode, field number, scanning line number, and the like. An output of the ID generation circuit 24 and outputs of the ECC addition circuits 22A and 22B are multiplexed on the time base by switches 26A and 26B. That is, the switches 26A and 26B are switched so that one ID data is added to the data of a few scanning lines.

Digital modulation circuits 28A and 28B execute a low band suppressing modulation such as an 8-9 modulation or the like to signals from the switches 26A and 26B. Outputs of the digital modulation circuits 28A and 28B are supplied to magnetic heads HA+, HB+, HA− and HB− through amplifiers 30A and 30B, change-over switches 32A and 32B for recording/reproduction, and head selecting switches 34, 36, 38, and 40 and are recorded onto a magnetic tape 42.

FIG. 2 shows a timing chart of switching control signals $S_1$, $S_2$, $S_3$, and $S_4$ of the switches 34, 36, 38, and 40. FIG. 2A shows the case of the normal mode. FIG. 2B shows the case of the double mode. $d_1$ and $d_2$ indicate signals of common contact portions of the switches 32A and 32B. When the control signals $S_1$, $S_2$, $S_3$, and $S_4$ are at the high level, the corresponding switches 34, 36, 38, and 40 are turned on. A hatched portion in FIG. 2B shows that a signal to be recorded does not exist. The time base compression to form the hatched portion is executed by the frame memory 14.

FIG. 3A is a plan view of a rotary cylinder having the magnetic heads HA+, HB+, HA− and HB−. FIG. 3B is a development diagram in the circumferential direction of the rotary drum. As shown in FIG. 3A, the magnetic tape 42 is wrapped around the outer peripheral surface of a rotary cylinder 44 by an angle range of 180° or more. The heads HA+, and HB+ attached to the rotary cylinder 44 have a plus azimuth and the heads HA− and HB− have a minus azimuth. The heads HA+ and HB+ rotate with a phase difference of 180°. The heads HA− and HB− also similarly rotate with a phase difference of 180°. On the other hand, the heads HA+ and HB− rotate with a phase difference of an angle $\theta$.

The operations of the heads in the normal mode and the double mode will now be described. The rotary cylinder 44 rotates two times for a period of time when the video signal of one frame is input to the input terminal 10. That is, in the case of the NTSC signal, a rotational speed of the cylinder 44 is set to 3,600 rpm. In the normal mode, each of the magnetic heads HA+, HB+, HA− and HB− traces the magnetic tape 42 two times for a period of time when the cylinder 44 rotates twice, thereby recording the signal onto the magnetic tape 42. During such a period of time, the magnetic tape 42 is conveyed at a predetermined speed in a manner such that eight tracks are formed in one frame at a predetermined track pitch $T_p$ by a capstan 48 which is controlled by a capstan control circuit 46.

In the double mode, the signal is recorded onto the magnetic tape 42 by the tracing operations of two times of the magnetic heads HA+ and HA− for a period of time when the cylinder 44 rotates twice. The magnetic heads HB+ and HB− are not used. If the tracing direction of the head is set at small enough an inclination angle for the longitudinal direction of the magnetic tape 42, the conveying speed of the magnetic tape 42 by the capstan 48 is ½ of that in the normal mode and the number of tracks which are formed in one frame is set to four.

FIG. 4A shows a track pattern in the normal mode. FIG. 4B shows a track pattern in the double mode. In FIGS. 4A and 4B, TA+, TB+, TA− and TB− respectively indicate tracks which were recorded by the magnetic heads HA+, HB+, HA− and HB−.

A system control circuit 50 in FIG. 1 controls the foregoing recording operation and also controls the reproducing operation, which will be explained later herein.

In the reproducing mode, the switches 32A and 32B are connected to the P contact side and the switches 34, 36, 38, and 40 are connected or disconnected at timings similar to those in the recording mode. Thus, reproduction signals of two systems can be derived from the P contacts of the switches 32A and 32B. The reproduction signals are amplified by reproducing amplifiers 52A and 52B and demodulated by digital demodulation circuits 54A and 54B. ECC decoding circuits 56A and 56B error-correct the demodulation outputs of the digital demodulating circuits 54A and 54B. A composition circuit 58 synthesizes error correction outputs of the ECC decoding circuits 56A and 56B, thereby obtaining the original signal of one system. On the other hand, an ID decoding circuit 60 extracts and decodes the ID data portions from the outputs of the modulation circuits 54A and 54B.

In the case of the signal recorded in the normal mode, an output of the composition circuit 58 is supplied to a frame memory 66 through a switch 64. In the case of the signal recorded in the double mode, the signal is decoded by a DPCM decoding circuit 62 and, thereafter, it is supplied to the frame memory 66 via the switch 64. The DPCM decoding circuit 62 expands the signal which was compressed into four bits in the amplitude direction into the original 8-bit signal.

The frame memory 66 stores the input reproduction data into proper pixel positions in accordance with the ID data from the ID decoding circuit 60. Since only the effective pixels are input as the reproduction data into the frame memory 66, the blanking period is added here. On the other hand, in the double mode, there is executed a time base conversion for reconstructing the data which is intermittently reproduced into a predetermined image signal. An output of the frame memory 66 is converted into an analog signal by a D/A converter 68 and is output to the outside through an output terminal 70.

In the above conventional example, if the operator wants to execute a special reproduction such as a searching operation at a speed different from the speed upon recording, the simplest method is to change the speed of the capstan 48 by generating a common from the system control circuit 50 to the capstan control circuit 46. For instance, in FIG. 5A, in the case where the magnetic tape which had been recorded in the normal mode was searched at a speed which is 4.6 times as high as the speed in the normal mode, a portion from which data can be reproduced in a state in which the azimuth angle of the recording track coincides with the azimuth angle of the reproducing head is shown as a hatched region. #1 to #7 show relative field numbers to which the reproduced data belongs. Since the ID data including the scanning line numbers and the like have been recorded together with the image data, it is possible to discriminate between the position of the scanning line on the display screen where the image data is located from and the ID data which was reproduced and decoded, so that the reproduction image data can be written at the proper location in the frame memory 66.

On the other hand, FIG. 5B shows the case where the magnetic tape recorded in the double mode was searched at a speed which is 4.6 times as high as the speed in the double mode. A region from which data can be reproduced is shown by a hatched region. #1, #2, #3, #6, and #7 indicate relative field numbers to which the reproduced data belongs. As will be understood from FIG. 5B, a time interval of reproducible data is fairly larger than that in the normal mode. As mentioned above, in what is called a long-time mode for recording by reducing the information amount, the images which are recorded are the partial images lacking absolute information. Therefore, there is a problem in that the data which can be reproduced in a special reproducing mode is also the further partial data, and the reproduced image becomes unrefined.

SUMMARY OF THE INVENTION

It is an object of the invention to solve the problems as mentioned above.

Another object of the invention is to provide an information signal reproducing apparatus which can obtain a relatively good reproduction signal even in the case of reproducing a tape-like recording medium which was recorded in a recording mode in which the number of tracks per unit time is small.

Under the above objects, according to the invention, as one embodiment, there is provided an information signal reproducing apparatus comprising:

(a) reproducing means for reproducing a recorded information signal from a tape-like recording medium formed with a number of tracks in accordance with any one of a plurality of recording modes in which the numbers of recording tracks per unit time differ, the reproducing means including first and second head means;

(b) conveying means for conveying the tape-like recording medium; and (c) mode switching means for switching the apparatus among a plurality of reproducing modes including a first reproducing mode, wherein the conveying means conveys the tape-like recording medium which was recorded in the first recording mode in the plurality of recording modes at substantially the same speed as that in the first recording mode, and the reproducing means reproduces the recording signal by using both of the first and second head means, a second reproducing mode, wherein the conveying means conveys the tape-like recording medium, which was recorded in the second recording mode in the plurality of recording modes in which the number of recording tracks per unit time is smaller than that in the first recording mode, at substantially the same speed as that in the second recording mode, and the reproducing means reproduces the recording signal by using only the first head means, and a third reproducing mode, wherein the conveying means conveys the tape-like recording medium, which was recorded in the second recording mode, at a speed different from that in the second recording mode, and the reproducing means reproduces the recording signal by using both the first and second head means.

The above and other objects and features of the present invention will become apparent from the following detailed description and the appended claims with reference to the accompanying drawings.

DETAILED DESCRIPTION OF THE PREFERRED EMBODIMENTS

An embodiment of the invention will be described hereinbelow with reference to the drawings.

Figure 1:
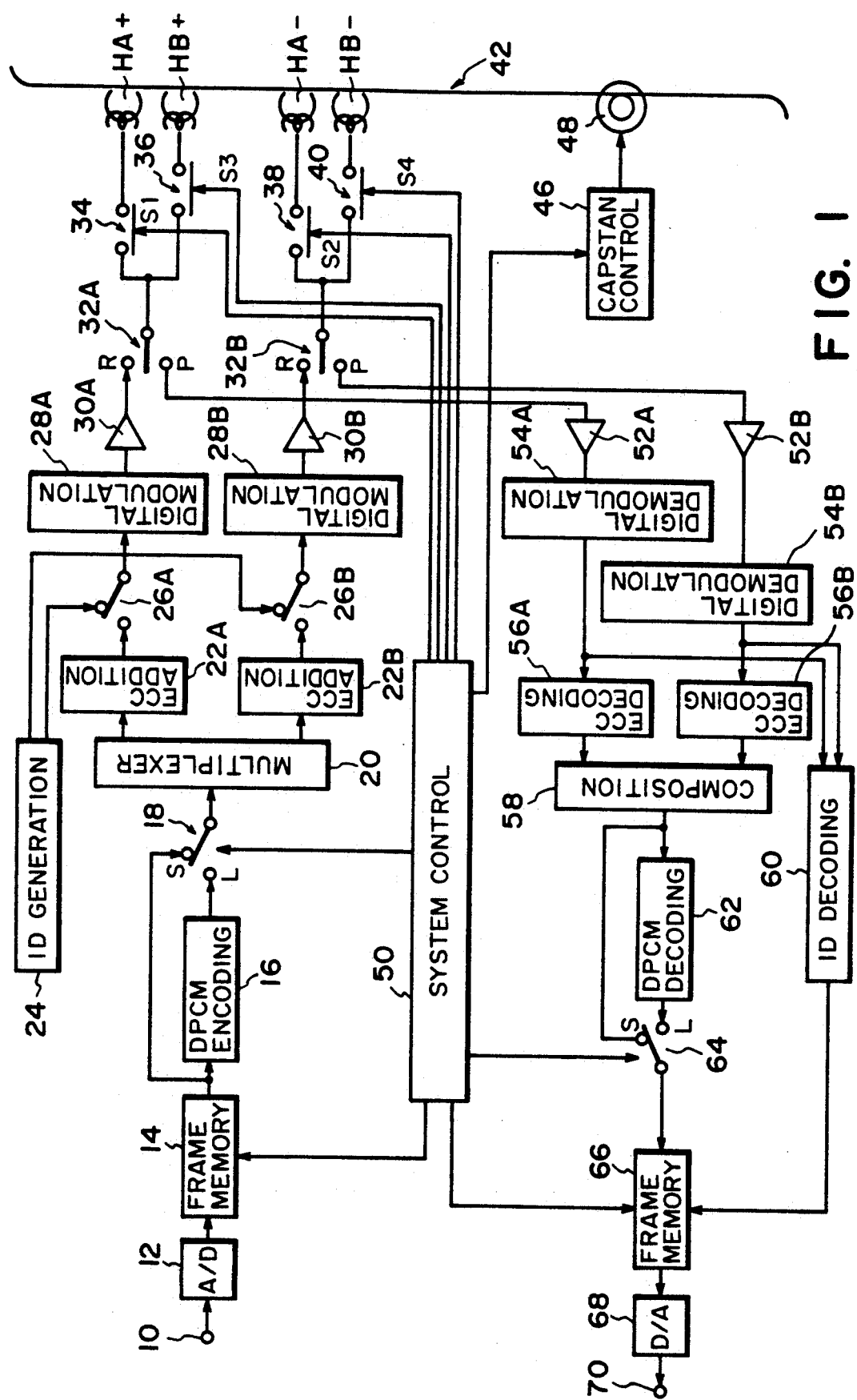
FIG. 1 is a block diagram showing an example of a construction of a conventional digital signal recording and reproducing apparatus.
Figure 2A:
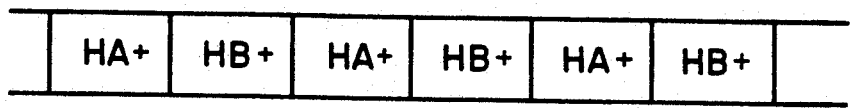
FIGS. 2A and 2B are timing charts showing timings of switching control signals $S_1$ to $S_4$ and recording or reproduction signals $d_1$ and $d_2$ in FIG. 1.
Figure 2A:
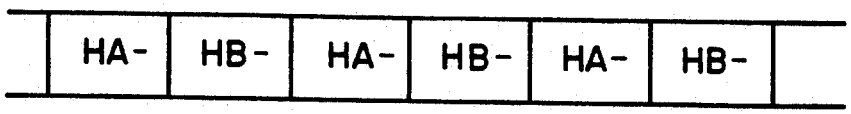
Figure 2A:
Figure 2A:
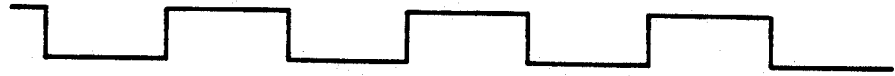
Figure 2B:
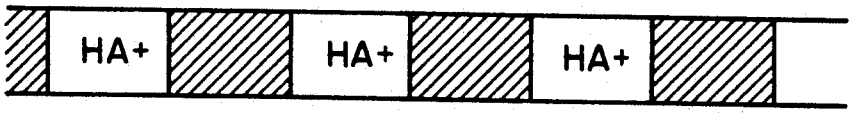
Figure 2B:
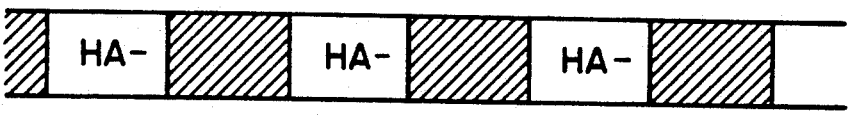
Figure 2B:
Figure 2B:
Figure 3A:
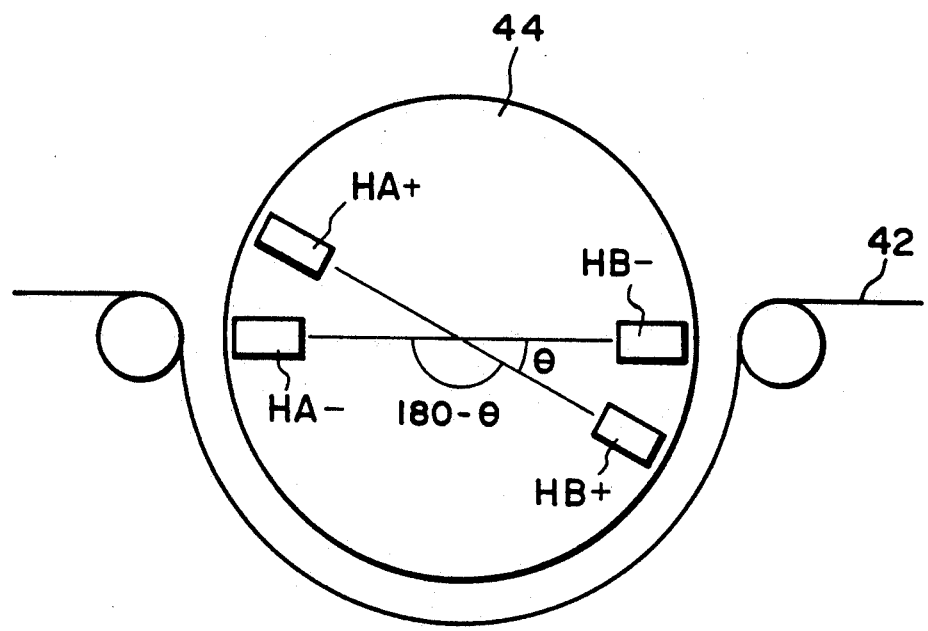
FIG. 3A is a diagram showing an arrangement of four heads on a cylinder in FIG. 1.
Figure 3B:
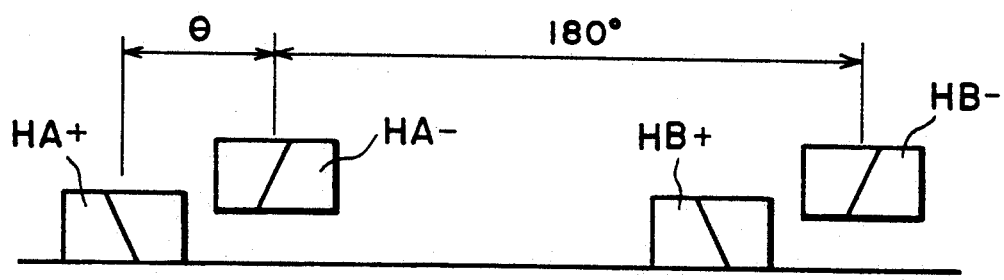
FIG. 3B is a diagram showing a developed state of the arrangement of four heads in FIG. 3A.
Figure 4A:
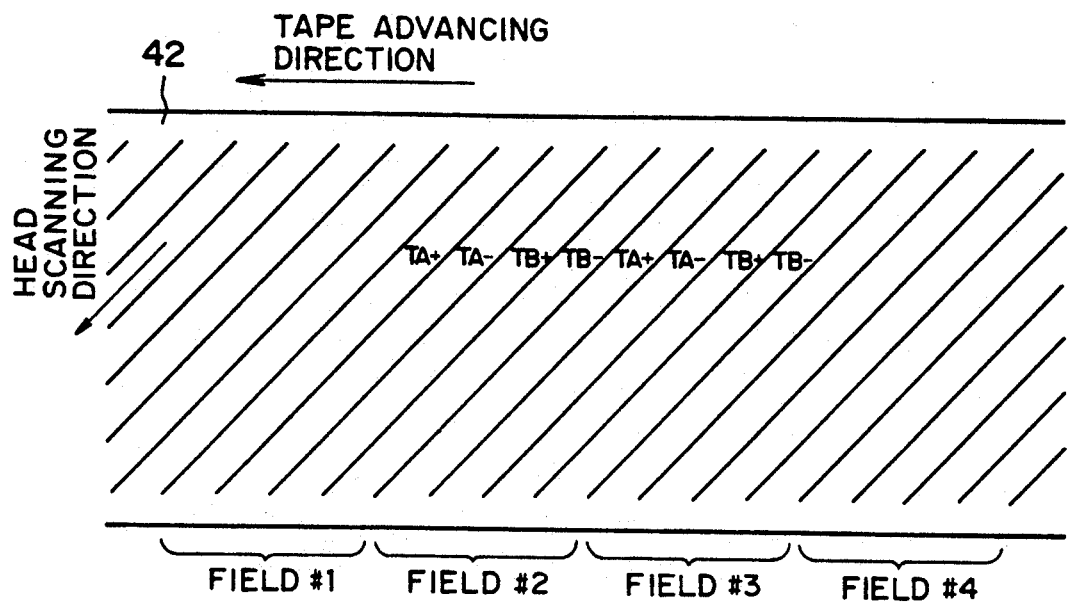
FIG. 4A is a diagram showing a recording track pattern in the normal mode.
Figure 4B:
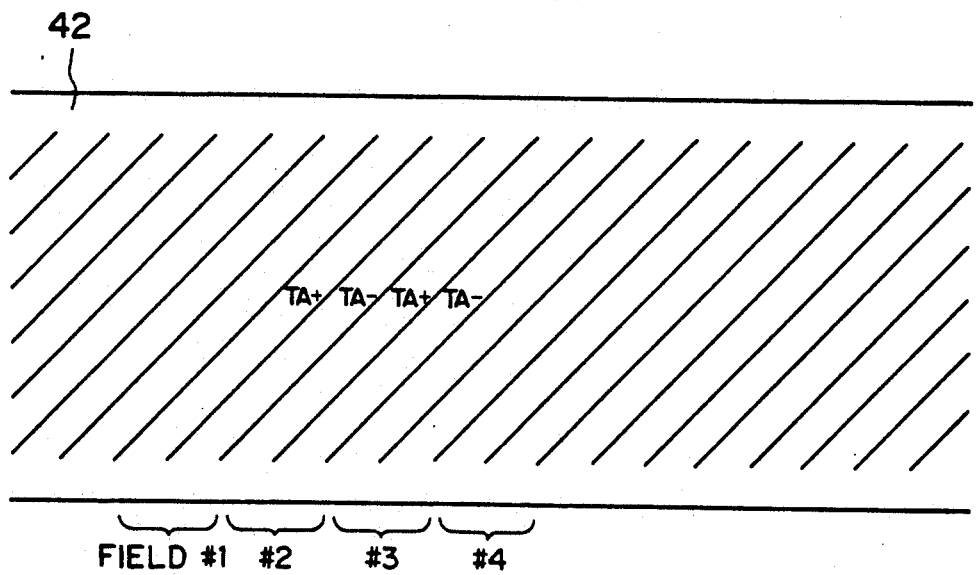
FIG. 4B is a diagram showing a recording track pattern in the double mode.
Figure 5A:
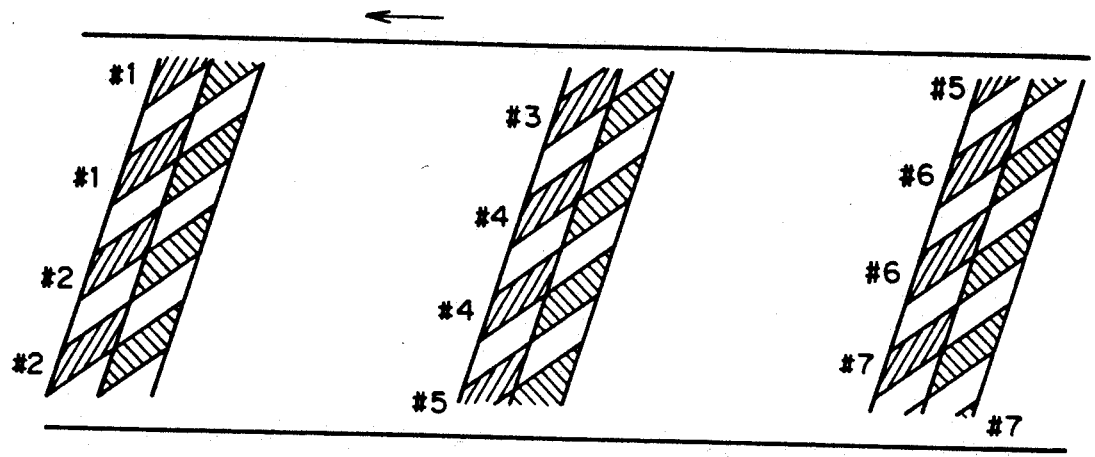
FIG. 5A is a diagram for explaining a state of the head tracing operation in the case where a signal which had been recorded in the normal mode was searched and reproduced in the apparatus of FIG. 1.
Figure 5B:
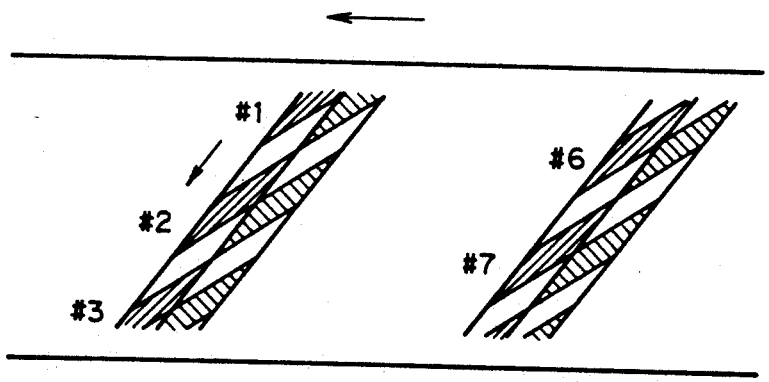
FIG. 5B is a diagram for explaining a state of the head tracing operation in the case where a signal which had been recorded in the double mode was searched and reproduced in the apparatus of FIG. 1.
Figure 6:
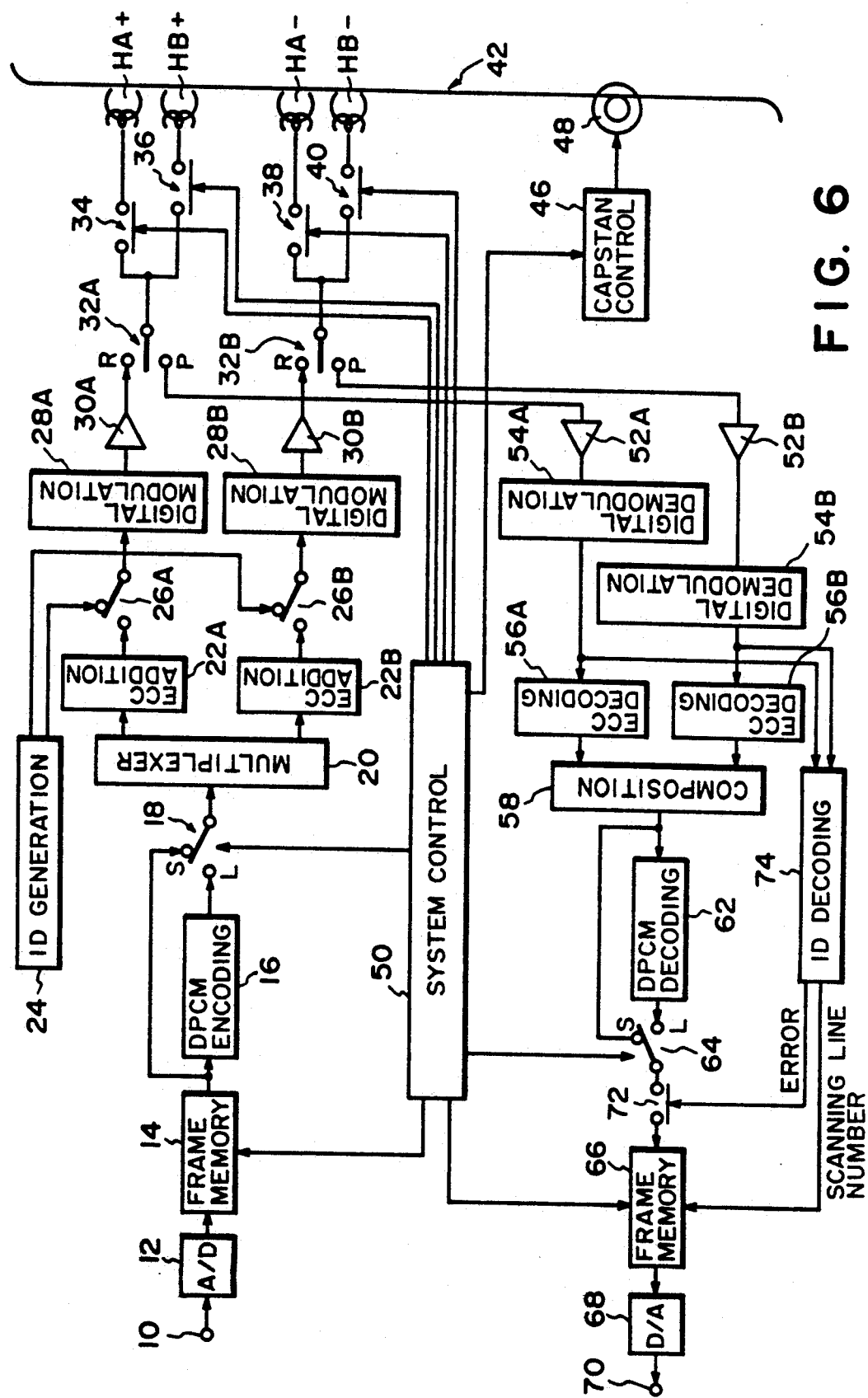
FIG. 6 is a block diagram showing a construction of a digital signal recording and reproducing apparatus according to an embodiment of the invention.

FIG. 6 shows a constructional block diagram of the embodiment of the invention. In FIG. 6, the same parts and components as those shown in FIG. 1 are designated by the same reference numerals. A switch 72 is arranged between the switch 64 and the input of the frame memory 66. An ID decoding circuit 74 for outputting a scanning line number signal and an error signal of the ID data is used in place of the ID decoding circuit 60 in FIG. 1. The on/off operation of the switch 72 is controlled by a decoded error signal of the ID decoding circuit 74.

Upon reproduction of the recording signal in the double mode, the decoded data by the DPCM decoding circuit 62 is input to the frame memory 66 through the switches 64 and 72. On the other hand, the ID decoding circuit 74 decodes the ID data from the outputs of the demodulating circuits 54A and 54B. If any uncorrectable error exists, the error signal is input to a control terminal of the switch 72, thereby opening the switch 72. If there is no error, the scanning line number signal is input to the frame memory 66. Therefore, if no uncorrectable error exists in the decoded ID data, the DPCM decoded data is written into a proper location in the frame memory 66. If any uncorrectable error exists in the decoded ID data the DPCM decoded data is not written into the frame memory 66. The former situation occurs in the case where the recording data cannot be reproduced, for example, because the azimuth angle of the magnetic heads differs from the azimuth angle of the recording signal on the magnetic tape. Due to this, it is possible to prevent uncertain data being written into the frame memory 66. A method of reading the storage data from the frame memory 66 and the reading timing are the same as those in the conventional apparatus.

Figure 7:
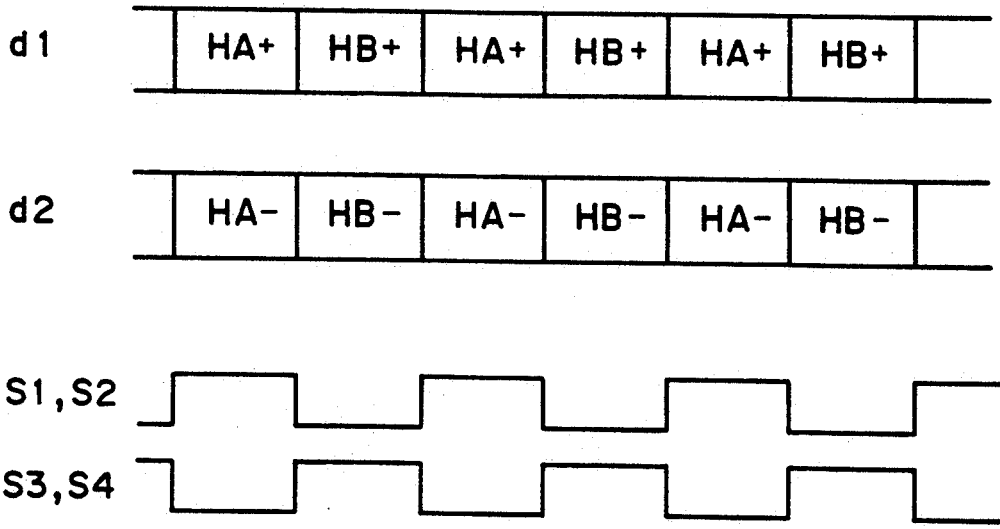
FIG. 7 is a timing chart showing timings of the switching control signals $S_1$ to $S_4$ and the reproduction signals $d_1$ and $d_2$ in the searching and reproducing mode in the apparatus of FIG. 6.
Figure 8:
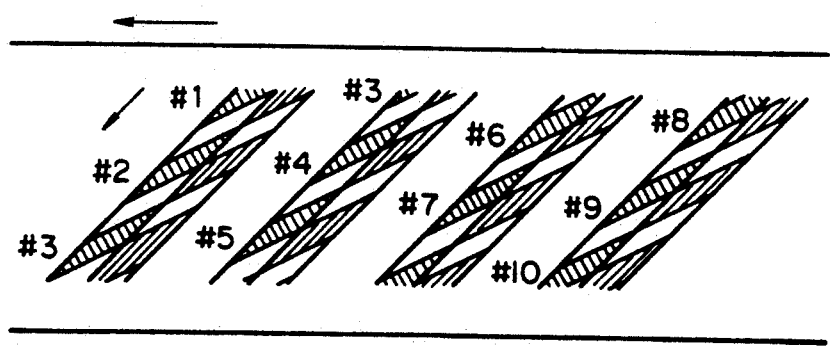
FIG. 8 is a diagram showing a state of the head tracing operation in the case where a signal which had been recorded in the double mode was searched and reproduced in the apparatus of FIG. 6.

On the other hand, in the embodiment, the heads HB+ and HB− which are not used in the conventional apparatus are used upon reproduction of the recording signal in the double mode. That is, the switches 34, 36, 38, and 40 are on/off controlled by the control signals $S_1$, $S_2$, $S_3$, and $S_4$ shown in FIG. 7 on the basis of the rotation of the cylinder 44 so that the reproduction outputs of the heads HB+ and HB− can be extracted. Due to this, as shown in FIG. 8, a larger amount of data can be reproduced. A hatched region in FIG. 8 shows a region of the reproducible data. The data of the fields #4, #5, #8, #9, and #10 are the data obtained by the heads HB+ and HB− which could not be reproduced in the conventional apparatus.

As mentioned above, according to the embodiments, since the data of the fields in the intermediate time points in the conventional example can be obtained, a degree of refined reproduced image decreases and the number of data which can be reproduced is also increased about two times. Thus, the resolution is extremely improved.

Figure 9A:
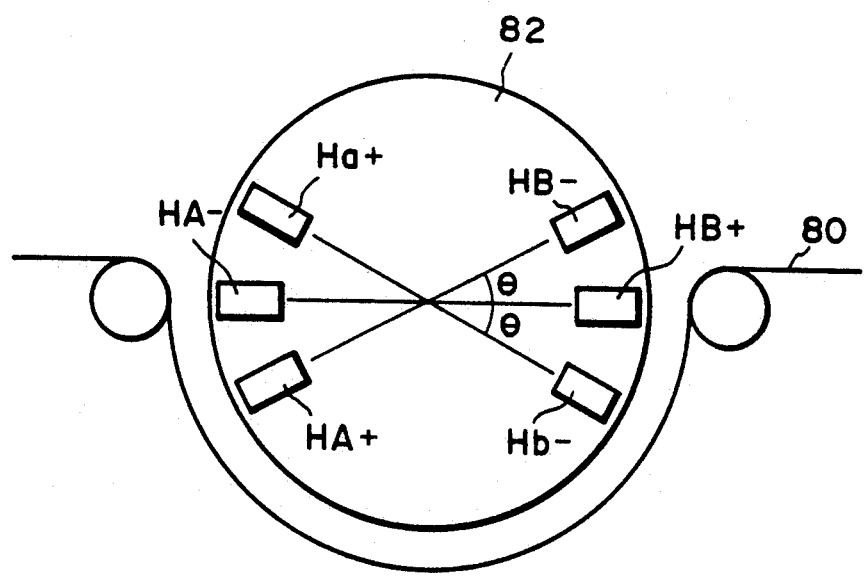
FIG. 9A is a diagram showing an arrangement of six heads on the cylinder according to a modification of the apparatus of FIG. 6.
Figure 9B:
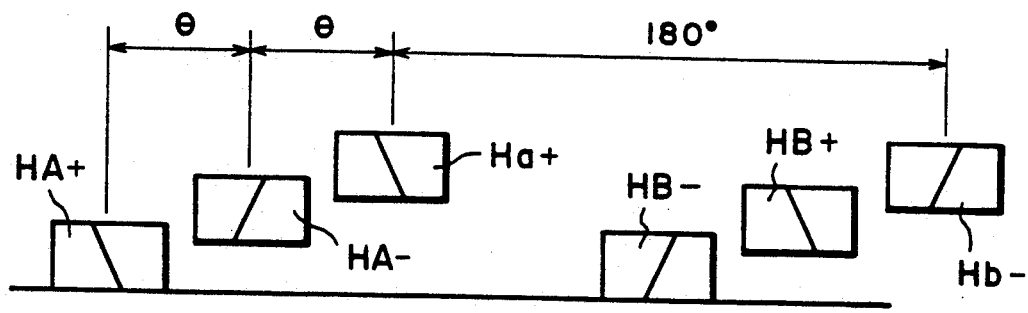
FIG. 9B is a diagram showing a developed state of the arrangement of six heads in FIG. 9A.

Explanation will now be made with respect to an embodiment in the case where the invention was applied to a digital signal recording and reproducing apparatus having the normal mode and a mode which can record for a period of time which is triple as long as that in the normal mode (hereinafter, such a mode is referred to as a triple mode). FIG. 9A is a plan view showing an arrangement of heads in such an embodiment. FIG. 9B shows a development diagram taken along the outer peripheral surface of the cylinder. Heads HA+, HA−, Ha+, HB−, HB+ and Hb− are attached to a cylinder 82 around which a magnetic tape 80 was wrapped in an angle range of 180° or more. The heads HA+, HA− and Ha+ are attached at the positions which face the heads HB−, HB+ and Hb− by an angle of 180°, respectively.

Figure 10:
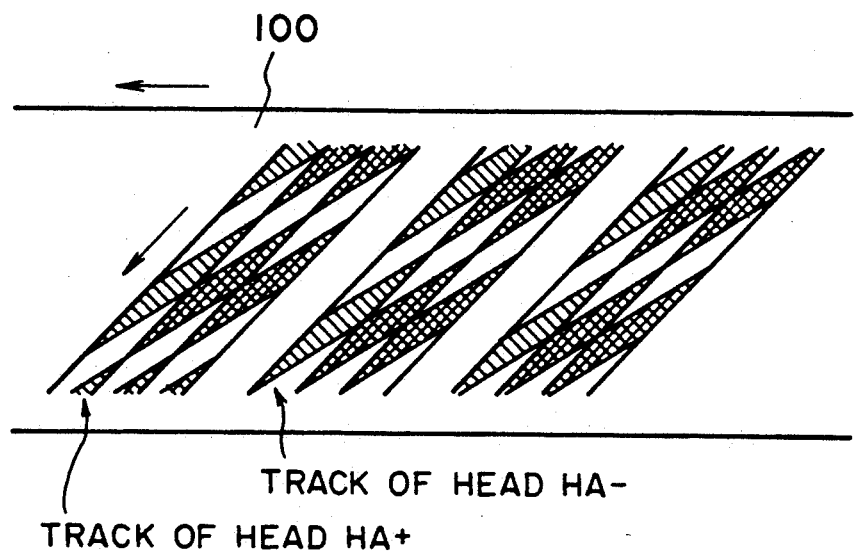
FIG. 10 is a diagram showing a state of the head tracing operation in the case where a signal which had been recorded in the triple mode was searched and reproduced by the head arrangement shown in FIGS. 9A and 9B.

In the case of executing the recording and reproduction in the normal mode, all of the six heads are used. However, in the case of the triple mode, only the heads HA+ and HB− are used and the feeding speed of the magnetic tape is also set to ⅓ of that in the normal mode. FIG. 10 shows a region in which data can be reproduced in the case where a magnetic tape 100 which had been recorded in the triple mode was searched at a speed which is 4.6 times as high as that in the normal mode. As mentioned above, the data of an amount which is about three times as large as that in the conventional example can be obtained. Therefore, by constructing a picture plane by using the added ID data, a more natural search image can be obtained.

The specific search of speed of integer times has been described above. However, essentially, by reproducing the signal by using the heads which were not used in the conventional apparatus in a long-time mode, a similar effect can also be obtained in almost all of the search of speed of integer times or a slow motion reproducing mode. On the other hand, the invention can also be applied to a general digital signal recording and reproducing apparatus which realizes the long-time mode by selectively using some of a plurality of heads which are used in the normal mode. In this case, similar operations and effects can be obtained.

As will be easily understood from the above description, according to the invention, even in the case where the signal which had been recorded in the recording mode in which the number of recording tracks per unit time is small was reproduced at a speed different from that in the recording mode, a larger amount of signal can be reproduced and the reproduced signal of a high quality can be obtained.

What is claimed is:

1. An information signal reproducing apparatus comprising:
   (a) reproducing means for reproducing a recorded information signal from a tape-like recording medium on which a plurality of tracks are formed according to one of a plurality of recording modes, said reproducing means including first and second head means for periodically tracing said tape-like recording medium, said plurality of recording modes including a first recording mode in which a first number of tracks are formed per unit time by using both said first and second head means and a second recording mode in which a second number of tracks are formed per unit time by using only the first head means, said second number being less than said first number;
   (b) conveying means for conveying the tape-like recording medium; and
   (c) head means changing means for changing said first and second head means to be used for reproduction between a plurality of reproducing modes including
   a first reproducing mode, wherein the conveying means conveys the tape-like recording medium at substantially the same speed as that in the first recording mode, and the reproducing means reproduces the recorded information signal by causing both of the first and second head means to trace each of tracks formed in said first recording mode,
   a second reproducing mode, wherein the conveying means conveys the tape-like recording medium at substantially the same speed as that in the second recording mode, and the reproducing means reproduces the recorded information signal by causing only the first head means to trace each of tracks formed in said second recording mode, and
   a third reproducing mode, wherein the conveying means conveys the tape-like recording medium at a speed different from that in the second recording mode, and the reproducing means reproduces the recorded information signal by causing both of the first and second head means to trace tracks formed in said second recording mode.

2. An apparatus according to claim 1, wherein each of the first and second head means includes a rotary head.

3. An apparatus according to claim 2, wherein the first and second head means respectively include a pair of rotary heads each having different azimuth angle.

4. An apparatus according to claim 2, wherein the first and second head means include a plurality of heads which are closely arranged each other.

5. An apparatus according to claim 1, wherein the recording signal includes a video signal and the reproducing means includes a memory for reconstructing the signal(s) reproduced from the first and/or the second head means in accordance with a position on a display screen.

6. An information signal reproducing apparatus, comprising:
   (a) reproducing means for reproducing a recorded information signal from a tape-like recording medium formed with a number of tracks in accordance with any one of a plurality of recording modes, said plurality of recording modes including a first recording mode in which conveying speed of the tape-like recording medium is a first speed and a second recording mode in which conveying speed of the tape-like recording medium is a second speed slower than the first speed, said reproducing means including first and second head means for periodically tracing the tape-like recording medium;
   (b) conveying means for conveying the tape-like recording medium; and
   (c) head means changing means for switching the apparatus among a plurality of reproducing modes including
   a first reproducing mode, wherein the conveying means conveys the tape-like recording medium at substantially the first speed, and the reproducing means reproduces the recorded information signal which was recorded by both of the first and second head means in said first recording mode, by causing both of the first and second head means to trace each of tracks formed in said first recording mode,
   a second reproducing mode, wherein the conveying means conveys the tape-like recording medium at substantially the second speed, and the reproducing means reproduces the recorded information signal which was recorded by only said first head means in said second recording mode, by causing only the first head means to trace each of tracks formed in said second recording mode, and
   a third reproducing mode, wherein the conveying means conveys the tape-like recording medium at a speed different from the second speed, and the reproducing means reproduces the recorded information signal which was recorded by only the first head means in said second recording mode, by causing both of the first and second head means to trace tracks formed in said second recording mode.

7. A video signal recording and reproducing apparatus comprising:
   (a) recording means for recording a video signal onto a recording medium, said recording means including first and second recording head means for periodically tracing the recording medium to form a number of tracks;
   (b) recording mode switching means for switching a recording mode of the recording means among a plurality of recording modes including
   a first recording mode, wherein the recording means records the video signal on a number of tracks by using both of the first and second recording head means, and
   a second recording mode, wherein the recording means records the video signal on a number of tracks by using only the first recording head means;
   (c) reproducing means for reproducing the video signal recorded on the recording medium, said reproducing means including first and second reproducing head means for periodically tracing the recording medium; and (d) recording head means changing means for changing said first and second recording head means to be used for reproduction between a plurality of reproducing modes, said plurality of reproducing modes including a first reproducing mode, wherein the reproducing means reproduces the video signal by causing both of the first and second reproducing head means to trace each of tracks formed in said first recording mode, a second reproducing mode, wherein the reproducing means reproduces the video signal by causing only the first reproducing head means to trace each of tracks formed in said second recording mode, and a third reproducing mode, wherein the reproducing means reproduces the video signal by causing both of first and second reproducing head means to trace tracks formed in said second recording mode.

8. An apparatus according to claim 7, wherein the first recording head means and the first reproducing head means include common rotary heads, and the second recording head means and the second reproducing head means include common rotary heads.

9. An apparatus according to claim 8, wherein the first recording head means and the first reproducing head means respectively include a pair of common rotary heads each having different azimuth angle.

10. An apparatus according to claim 7, further comprising:

conveying means for conveying the recording medium in a manner such that the recording medium is conveyed at a first speed in the first recording mode and the first reproducing mode, the recording medium is conveyed at a second speed slower than the first speed in the second recording mode and the second reproducing mode, and the recording medium is conveyed at a third speed different from the second speed in the third reproducing mode.

11. An information signal reproducing apparatus comprising:

(a) head means having a plurality of heads for reproducing a recorded information signal from a tape-like recording medium formed with a number of tracks in accordance with any one of a plurality of recording modes, said plurality of recording modes including a first recording mode in which a first number of recording tracks are formed per unit time and a second recording mode in which a second number of recording tracks are formed per unit time, said second number being smaller than said first number, and said head means periodically tracing the tape-like recording medium;

(b) mode switching means for switching the apparatus among a plurality of reproducing modes, said plurality of reproducing modes including a first reproducing mode, wherein said head means reproduces the recorded information signal from tracks formed in said first recording mode in all periods of tracing the tracks, a second reproducing mode, wherein said head means reproduces the recorded information signal from tracks formed in said second recording mode in skipping periods of tracing the tracks, and a third reproducing mode, wherein said head means reproduces the recorded information signal from the tracks formed in said second recording mode in all periods of tracing the tracks; and (c) head switching means for changing heads of said head means to be used for reproduction according to said plurality of recording modes, said head switching means switching heads of the head means to be used such that another head is used in addition to the head which was used to record the information signal, when the information signal recorded in said second recording mode is reproduced in said first or third reproducing mode, and a head used to record the information signal is used when the recorded information signal is reproduced in the reproducing mode corresponding to the recording mode in which the information signal is recorded.

12. An information signal reproducing apparatus, comprising:

(a) head means for recording and reproducing an information signal, said head means including first and second head means;

(b) reproduction means for reproducing from a recording medium the information signal recorded by said head means in a plurality of recording modes, said plurality of recording modes including a first recording mode in which a predetermined number of tracks are formed per unit time by both of said first and second head means, and a second recording mode in which a number of tracks less than said predetermined number of tracks are formed per the unit time by only said first head means, said reproduction means using both of said first and second head means when the information signal recorded in said second recording mode is reproduced in a reproduction condition which does not correspond to said second recording mode.

13. An apparatus according to claim 12, wherein each of said first and second head means includes a plurality of heads.

14. An apparatus according to claim 13, wherein each of said first and second head means includes a rotary head.

15. An apparatus according to claim 13, wherein each of said first and second head means includes a pair of rotary heads having respective different azimuth angles.

* * * * *